(12) United States Patent
Stephens (10) Patent No.: US 6,184,944 B1
(45) Date of Patent: *Feb. 6, 2001

(54) OPTICAL FLUID FOR PROJECTION PRISM

(75) Inventor: Craig P. Stephens, Carlsbad, CA (US)

(73) Assignee: Victor Company of Japan, Limited (JP)

( * ) Notice: Under 35 U.S.C. 154(b), the term of this patent shall be extended for 0 days.

This patent is subject to a terminal disclaimer.

(21) Appl. No.: 09/191,768

(22) Filed: Nov. 13, 1998

Related U.S. Application Data (63) Continuation-in-part of application No. 08/542,396, filed on Oct. 12, 1995, now Pat. No. 5,838,397.

(51) Int. Cl.[7] .................................................. G02F 1/1335

(52) U.S. Cl. .............................. 349/5; 359/620; 359/630; 359/631; 349/7; 349/8; 349/9

(58) Field of Search .................................... 349/5, 7, 8, 9; 359/620, 630, 631

(56) References Cited

U.S. PATENT DOCUMENTS

| | | |
|---|---|---|
| 2,403,731 | 7/1946 | MacNeille . |
| 4,343,535 | 8/1982 | Bleha, Jr. . |
| 4,650,286 | 3/1987 | Koda et al. . |
| 4,764,806 | 8/1988 | Altman . |
| 4,943,155 | * 7/1990 | Cross, Jr. ............................ 359/630 |
| 5,373,394 | 12/1994 | Oh . |

* cited by examiner

*Primary Examiner*—James A. Dudek
(74) *Attorney, Agent, or Firm*—Harness, Dickey & Pierce, P.L.C.

(57) ABSTRACT

An optical system is disclosed. The optical system includes a fluid. A container is filled with the fluid, and the container has at least one window for permitting subject light to enter the container. At least one optical element is disposed within the container for performing a predetermined optical function on the subject light. The fluid has a viscosity of no greater than 40 centistokes and the optical element has an index of refraction approximately the same as the fluid. The fluid provides increased transmission of blue light as a percentage of total light being transmitted.

23 Claims, 5 Drawing Sheets

SPECTRAL OUTPUT W/CARGILLE CODE 1160 AFTER UV

*Fig-3*

| CARGILLE CODE 1160 AFTER UV | | | | | |
|---|---|---|---|---|---|
| WHITE | X= | 0.342 | | EFF.ON= | 0.149164 |
| | Y= | 0.389 | | EFF.OFF= | 0.001575 |
| | | | | | |
| | $U^1=$ | 0.196 | | | |
| | $V^1=$ | 0.501 | | | REL.% |
| | | | | | |
| RED | $U^1=$ | 0.439 | | EFF.ON= | 3.79%  25.43% |
| | $V^1=$ | 0.534 | | | |
| | | | | | |
| GREEN | $U^1=$ | 0.111 | | EFF.ON= | 10.33%  69.28% |
| | $V^1=$ | 0.578 | | | |
| | | | | | |
| BLUE | $U^1=$ | 0.152 | | EFF.ON= | 0.79%  5.29% |
| | $V^1=$ | 0.167 | | | |
| | | | | TOTAL= | 14.92%  100% |

*Fig-4*

SPECTRAL OUTPUT W/DMP AND DEP AFTER UV

Fig-5

| DMP AND DEP AFTER UV | | | | | |
|---|---|---|---|---|---|
| WHITE | X= | 0.321 | | EFF.ON= | 0.210694 |
| | Y= | 0.353 | | EFF.OFF= | 0.002225 |
| | | | | | |
| | $U^1=$ | 0.195 | | | |
| | $V^1=$ | 0.482 | | | REL.% |
| | | | | | |
| RED | $U^1=$ | 0.438 | | EFF.ON= | 5.26% | 24.99% |
| | $V^1=$ | 0.534 | | | |
| | | | | | |
| GREEN | $U^1=$ | 0.111 | | EFF.ON= | 14.53% | 68.97% |
| | $V^1=$ | 0.576 | | | |
| | | | | | |
| BLUE | $U^1=$ | 0.164 | | EFF.ON= | 1.27% | 6.04% |
| | $V^1=$ | 0.147 | | | |
| | | | | TOTAL= | 21.07% | 100% |

OPTICAL FLUID FOR PROJECTION PRISM

CROSS-REFERENCE TO RELATED APPLICATION

This application is a continuation-in-part of U.S. patent application Ser. No. 08/542,396, filed Oct. 12, 1995 now U.S. Pat. No. 5,838,397, entitled IMPROVED OPTICAL FLUID FOR PROJECTION PRISM.

BACKGROUND OF THE INVENTION

1. Technical Field

The present invention relates to optical systems and more particularly to an optical system employing an optical fluid having improved performance.

2. Discussion

Optical fluids have a number of important applications in optical systems. In general, optical fluids are used to avoid abrupt shifts in index of refraction, encountered by a light beam, for example, when a light beam passes through an air/glass interface. The optical fluid, if its index matches that of the glass, minimizes this index of refraction change which would degrade optical performance.

One important application for optical fluids is a type of beam splitter which is widely used for selectively passing and reflecting a light beam. Such beam splitters include a thin, flat, parallel sided, transparent plate mounted in a transparent liquid or solid medium at an angle (commonly about 45 degrees), to the axis of the beam of light that is to be transmitted or reflected. Such beam splitters may be polarizing or non-polarizing.

A polarizing beam splitter, but not of the embedded (immersed in optical fluid) type, is described in U.S. Pat. No. 2,403,731 issued to MacNeille. The polarizing beam splitter, such as the MacNeille type polarizing beam splitter will pass light having one polarizing state, such as the "P" state, for example, and reflect light with another polarization state, such as the "S" state. Thus, the polarizing beam splitter selectively passes or transmits a light beam, depending upon whether the polarization vector of the light is one or the other of two mutually orthogonal directions. In the beam splitter described in the MacNeille patent, a plurality of dielectric layers of appropriate indices of refraction and thicknesses are deposited at the interface between the two halves of a glass cube wherein the mating surface extends diagonally between two diagonally opposite edges of the cube.

In an embedded MacNeille polarizing beam splitter, a housing of generally cubic configuration is provided with transparent front, back, entrance and exit windows. This housing is filled with a fluid in which is suspended a prism plate comprising a thin plate with mutually parallel planar sides that extend diagonally across the cube. A plurality of thin dielectric layers, of the type described in the MacNeille patent, may be applied to the thin plate to make this embedded prism a MacNeille polarizing prism. Such embedded prisms exhibit a color defect known as "lateral chromatic aberration", which significantly decrease clarity and resolution of transmitted light and also significantly reduces contrast, thereby producing an image of decreased quality. This aberration is due to the different variation of index refraction with color from one material to another.

To avoid bending of the light transmitted through the embedded prism plate, the prism and the fluid in which it is immersed are made of materials selected to have matching indices of refraction. As is well known, the index of refraction of a material is proportional to the reciprocal of the velocity of light propagated in the material, and such velocity varies from one material to another. Thus, as the light passes from one material to another with a different index of refraction, the light beam is bent. Accordingly, an embedded prism must be constructed with materials having the same index of refraction insofar as possible, if beam bending is to be minimized.

The embedded prism polarizing beam splitter, e.g. an embedded MacNeille-type polarizing beam splitter, is useful in a wide variety of applications. One example of such an application is a color projection system employing a liquid crystal light valve. Examples of such projection systems are described in U.S. Pat. No. 4,343,535 to Bleha, and in U.S. Pat. No. 4,650,286 to Koda. For example, some systems of this type may use a prism plate of Schott BK-7 glass having an index of refraction of 1.518298 at 554.5 nanometers in conjunction with a Cargille Code 1160 fluid having an index of refraction of 1.515 at the same wavelength at a temperature of 25 degrees Celsius.

In such a color projection system, as described in detail in these patents, light from a light source is reflected from a MacNeille prism to a liquid crystal light valve. This in turn causes the light valve to retroreflect light of a particular polarization in accordance with modulation imposed on the light valve by an image generator, such as a cathode ray tube. The uniquely polarized light modulated and retroreflected from the light valve is then transmitted through the embedded MacNeille prism and projected via a projection lens. The optical fluid minimizes bending of light at the fluid-glass interfaces as compared to a glass-interface. However, optical fluids do have some drawbacks.

In general, there are a number of desired characteristics for optical fluids when used in systems such as the above-described liquid crystal light valve color projection systems. For example, it is desirable that the optical fluid does not have toxic properties, has low vapor pressure, no disagreeable odor, does not have a high flash point, and has a freezing point which is below the operating temperature. Also it is desirable for the fluid to be soluble in commercial solvents for cleanup and be compatible with other optical materials. Conventional optical fluids, such as the Cargille Code 1160, generally meet these requirements.

However, there are additional desirable features which are not entirely met by conventional optical fluids. For example, Cargille Code 1160 is a chemical mixture which results in some undesirable features. First, it appears to contain a certain amount of contaminants and it is difficult to test for purity. Also, it does not appear to be consistent from batch to batch. As a result its properties, such as transmission properties, vary from batch to batch apparently due to variations in manufacturing processes. Furthermore, this fluid is relatively expensive and exhibits poor recovery from freezing. Moreover, because it has a relatively high viscosity, this fluid exhibits thermal instability, which results in refraction variations also known as heat waves. This results in fluctuations in the resulting image that limit resolution and cause oscillations irregularly across the image. For example, Cargille Code 1160 has a viscosity of 53 centistokes at 17 degrees Celsius as measured with a Zahn cup-type viscosimeter. Also, there appears to be some problems with the accumulation of particles on the glass plates in the MacNeille prisms.

Further, the Cargille Code 1160 optical fluid has relatively poor transmission throughout the appropriate visible optical spectrum. This is particularly noticeable in applications where the total optical path length in the fluid is long. In addition, this optical fluid exhibits low transmission in the blue region. As a result, in three color systems, red and green channels must be turned down to achieve a relatively higher level of blue transmission. This lowers the overall brightness of the system.

Thus, it would be desirable to provide an improved optical system which utilizes a superior optical fluid that has improved transmission. It would be particularly desirable for the fluid to have improved transmission in the blue spectrum to improve the color temperature, and thus avoid the necessity of lowering the red and green channels. It would also be desirable to provide a system utilizing an optical fluid which has low viscosity to minimize thermal irregularities. Furthermore, it would be desirable to provide such an optical fluid which is low in cost, which recovers well from freezing and which minimizes the formation of particles on internal glass plates. Also, it would be desirable to provide such a system utilizing a fluid which is pure and free of contaminants and which has consistently reproducible optical properties from batch to batch.

SUMMARY OF THE INVENTION

In carrying out the principles of the present invention in accordance with a preferred embodiment thereof, there is provided an optical system including a transparent fluid and a container filled with the fluid having at least one window for permitting subject light to enter therein. At least one optical element within the container performs a predetermined optical function on the subject light. The fluid is chosen to have a viscosity no greater than 40 centistokes and to have an index of refraction approximately matching that of the optical element. As a result, the present invention results in an optical system which reduces the thermal irregularities due to the low viscosity of the fluid. Also, the system has improved transmission, particularly in the blue spectrum. In addition, in the preferred embodiment dimethyl phthalate (DMP), or alternatively diethyl phthalate (DEP), is used which is relatively low in cost, has good recovery from freezing, is highly pure, and has reproducible optical qualities.

BRIEF DESCRIPTION OF THE DRAWINGS

The various advantages of the present invention will become apparent to one skilled in the art by reading the following specification and by reference to the following drawings in which.

DESCRIPTION OF THE PREFERRED EMBODIMENTS

Figure 1:
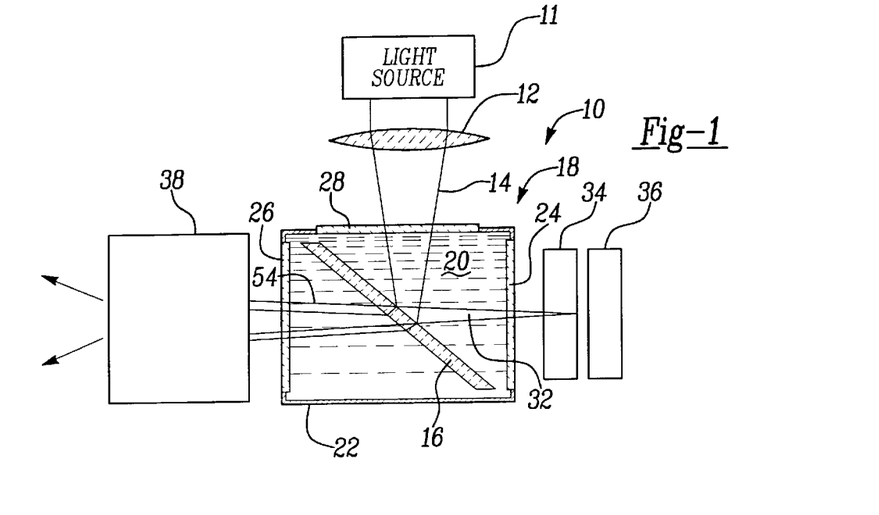
FIG. 1 is a diagram of a liquid crystal light valve projection system utilizing a MacNeille prism immersed in an improved optical fluid in accordance with a preferred embodiment of the present invention.

Referring to FIG. 1, there is shown a liquid crystal light valve color projection system of the type generally shown in U.S. Pat. Nos. 4,343,535 and 4,650,286 discussed above. In brief, this color projection system 10 includes a light source 11 that emits unpolarized light that is transmitted through a collimating lens 12 which directs the light beam 14 to a prism plate 16 of an embedded version 18 of a MacNeille prism. The MacNeille prism is a polarizing beam splitter which accomplishes selective polarization, as generally described in the MacNeille U.S. Pat. No. 2,403,731. The embedded MacNeille-type prism 18 schematically depicted in FIG. 1 comprises a parallel, flat sided, transparent prism plate 16 coated with a plurality of thin dielectric layers (as described in the MacNeille patent), and suspended in an optical fluid 20, all carried in a fluid-tight housing generally indicated at 22, having a transparent front window 24 and a transparent exit window 26. The polarizing beam splitter 18 also includes an input window 28 through which it receives randomly polarized light from source 11. The unpolarized light beam 14, which reaches transparent prism 16, has light of "S" polarization reflected and light of "P" polarization state transmitted.

Reflected light of "S" polarization state travels along a reflected beam 32 to a liquid crystal light valve 34 that is modulated by an image generating source such as a cathode ray tube 36. Where the screen of the cathode ray tube 36 has no phosphor emission and is therefore dark, the corresponding area of the light valve 34 remains in an off state, and light is retroreflected from the light valve 34 back to the polarizing prism with its polarization state unchanged. Because the polarization of the light is unchanged from its original "S" state, light is then reflected from the beam splitter prism plate 16 and returns to the light source 11. None of this light of the polarization state "S" is transmitted by the prism plate from the light valve 34 to the projection lens, and thus the corresponding areas imaged by a projection lens 38 remains dark.

For the phosphor areas of the screen of cathode ray tube 36 that are bright, some or all of the light reflected from the light valve 34 is rotated from "S" polarization state to "P" polarization state, and acquires an intensity proportional to the intensity of the light from the screen of the cathode ray tube 36. This light of polarization state "P" is retroreflected by the light valve 34 and transmitted through the prism plate 16, passing through the beam splitter exit window 26 and projection lens 38 to form a bright image on a projection screen (not shown).

As discussed above, the optical fluid 20 is utilized to reduce the shift in index of refraction encountered by the light beam 14 as it passes from the window 28 to optical fluid 20 and also through the interfaces between optical fluid 20, plate 16 and window 24. For example, in prior art systems of this type where the prism plate and windows are made of BK-7 glass having an index of refraction of 1.518298 at 554.5 nanometers, the optical fluid often employed for fluid 20 is Cargille Code 1160 fluid having an index of refraction of 1.515 at the same wavelength at 25 degrees Celsius. The viscosity of the Cargille Code 1160 fluid is approximately 53 centistokes at 17 degrees Celsius. As discussed above, however, there are a number of drawbacks with this optical fluid including the thermal instability problem due to high viscosity, poor transmission, poor recovery from freezing, high cost, and lack of purity and reproducability.

Thus, in accordance with the present invention, optical fluid 20 is composed of a single component, low-viscosity fluid which also has an index of refraction which matches, or nearly matches, BK-7 glass. In preferred embodiments of the present invention, fluid 20 comprises a transmissive, homogeneous fluid having a low molecular weight hydrocarbon, fluorocarbon, or chloroflurocarbon as a major component. For example, the fluid may be of the ester phthalate family such as dimethyl phthalate (DMP) or diethyl phthalate (DEP), with DMP being preferred. By "low viscosity" it is meant that the fluid has a viscosity no greater than 40 centistokes at 17 degrees Celsius as measured with a Zahn cup-type viscosimeter. One such viscosimeter is manufactured by Boekel, Inc. of Philadelphia, Pa. For example, DMP has a viscosity of about 32 centistokes at 17 degrees Celsius and a viscosity of about 10 centistokes at 25 degrees Celsius. DEP has a viscosity of about 30–31 centistokes at 17 degrees Celsius and a viscosity of about 9 centistokes at 25 degrees Celsius.

Figure 2:
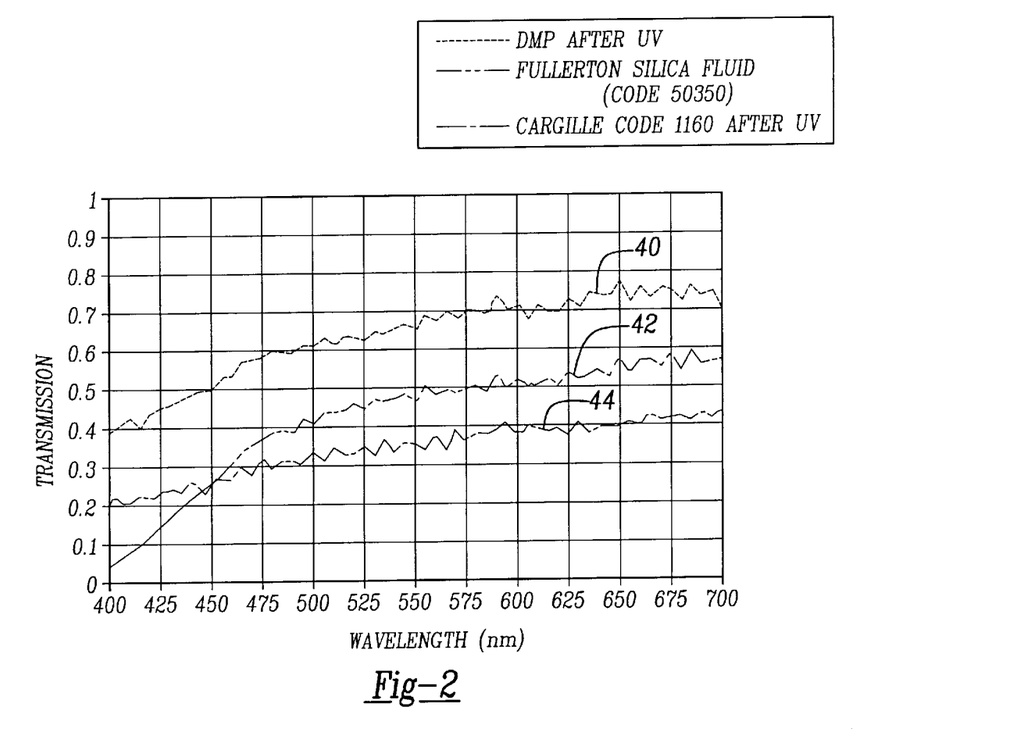
FIG. 2 is a graph of the transmission of various optical fluids versus wavelength throughout the visible spectrum.

Referring now to FIG. 2, there is shown a series of graphs comparing the spectral output of various optical fluids including the high viscosity Cargille Code 1160 and the low viscosity DMP. While a separate graph is not shown for DEP, it should be understood that the spectral output data for DEP produces a graph which is substantially similar to the graph shown for DMP. Data for generating this graph was taken from data measured for one centimeter of optical path extrapolated to 18 inches. In the upper graph labeled 40, the spectral output for DMP is shown. DMP is available from Aldrich Chemical Company of Milwaukee, Wis. In the middle graph, labeled 42, the spectral output for a silica matching fluid is shown. This comprises Cargille Code 50350 fluid, available from R.P. Cargille Laboratories Incorporated of Cedar Grove, N.J. The bottom graph, labeled 44 is the spectral output for Cargille Code 1160. The data shown is that of tests conducted after UV exposure. It is notable that the spectral output of DMP is significantly higher than Cargille Code 1160 throughout the visible spectrum. At the blue end of the spectrum, the transmission of DMP is nearly double that of the Cargille Code 1160 fluid. At 700 nanometers, the transmission of DMP is more than 50 percent higher than the 1160 fluid.

Figure 7:
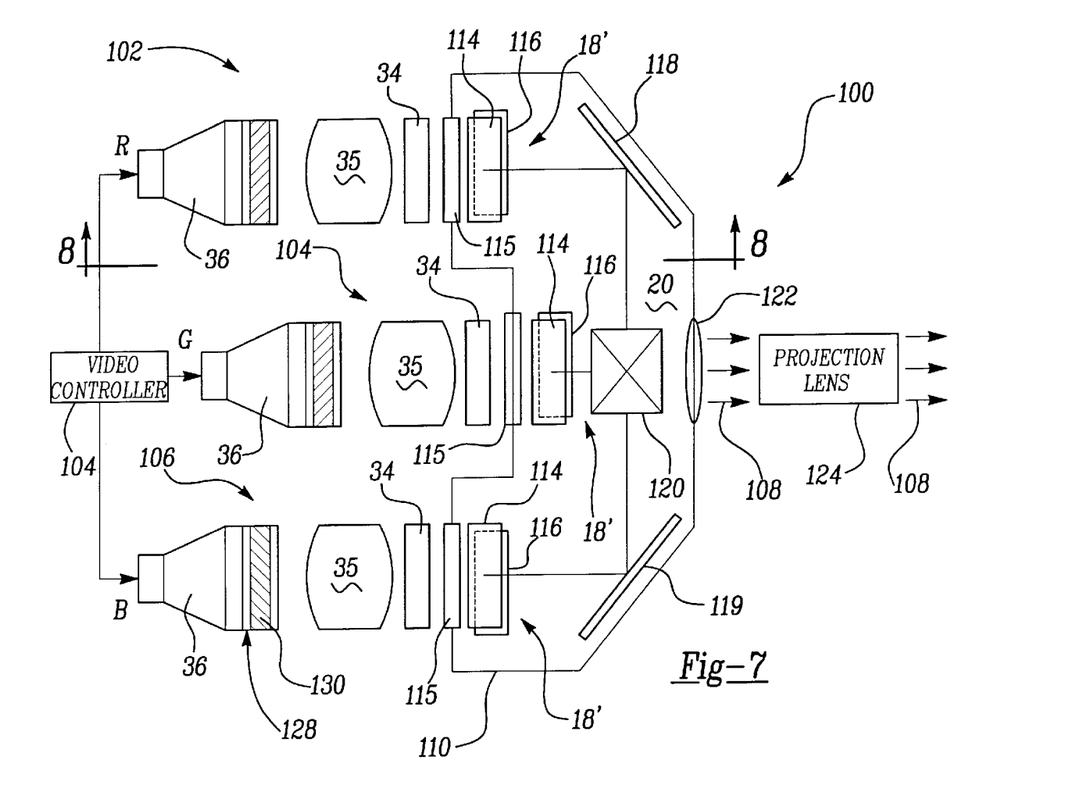
FIG. 7 is a top view of an optical fluid tank for housing the various optical elements which are immersed in the improved optical fluid in accordance with an alternate preferred embodiment of the present invention.
Figure 8:
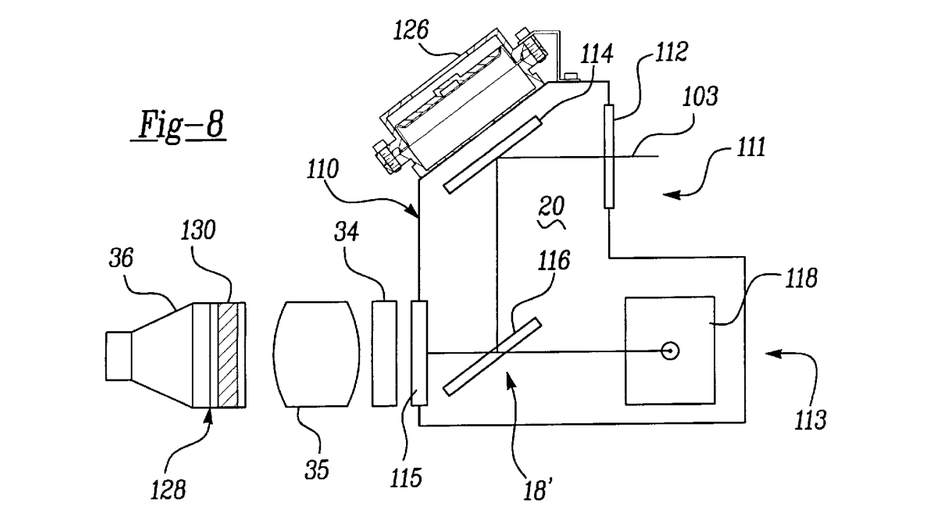
FIG. 8 is a cross-sectional view taken along line 8—8 of the optical fluid tank shown in FIG. 7 which is particularly suited for containing the optical fluid of the present invention.

These results translate into a significantly brighter image in the liquid crystal light valve (LCLV) projection system 10 shown in FIG. 1 and in the LCLV projection system 100 shown in FIGS. 7 and 8. Moreover, because of the relatively low transmission of the 1160 fluid in the blue region, when the 1160 fluid is used in a multi-channel system, the red and green channels must be turned down somewhat to compensate for the low blue transmission to achieve the desired color temperature. In contrast, with the use of DMP or DEP, the red and green channels do not need to be turned down to this extent to yield the desired color temperature. Therefore, the resulting image is brighter because the red and green channels can be at a higher intensity level. Thus, increased brightness in the image of the liquid crystal light valve projection system 10 or 100 in a three channel system is achieved for two reasons: 1) the higher transmission of the light throughout the optical spectrum as compared to Cargille Code 1160 and 2) with the higher resulting color temperature (due to higher transmission in the blue region) the red and green channels do not need to be turned down, thereby further increasing the overall brightness level. Thus, not only does DMP, or alternatively DEP, offer the advantages of low viscosity, but they have a higher transmission as well.

Figure 3:
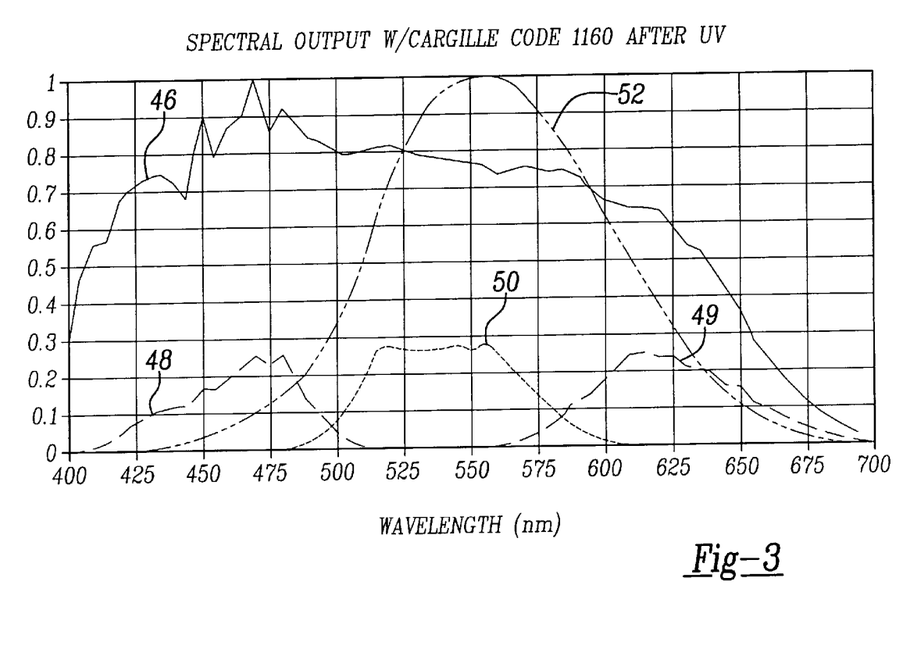
FIG. 3 is a graph of the spectral output of the Cargille Code 1160 prior art optical fluid verses wavelength throughout the optical spectrum for various spectral regions.
Figure 4:
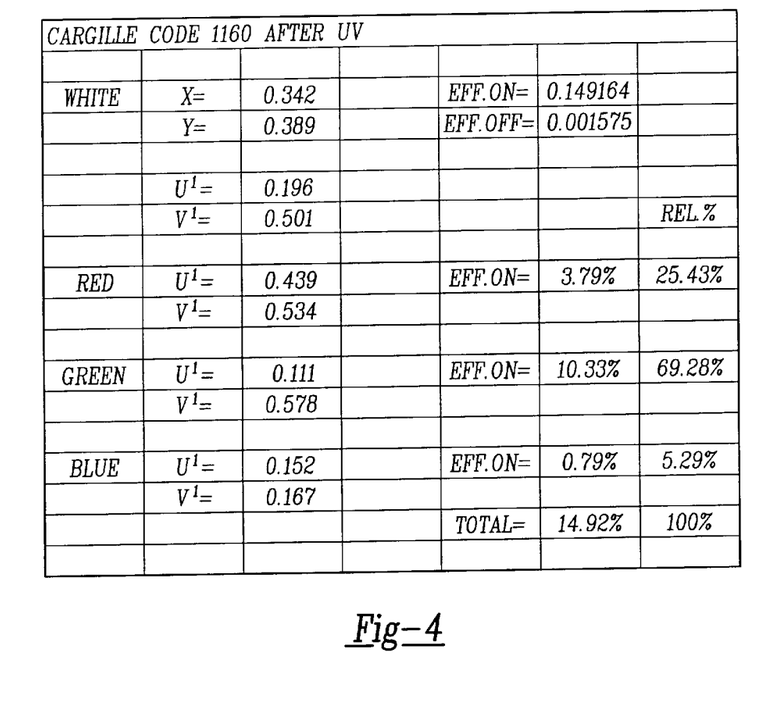
FIG. 4 is a table summarizing the data on which the FIG. 3 graph is based.

Referring now to FIG. 3, there is shown a series of graphs of the spectral output utilizing the Cargille 1160 optical fluid for three color channels. Curve 48 shows the transmission of blue light, curve 50 shows the transmission of green light, and curve 49 shows the transmission of red light. Curve 52 shows the (normalized) photoptical sensitivity curve which is assumed to be the ideal light source at the input of the prism. Curve 46 shows the expected spectral output obtained by combining the input and the transmission. As can be seen from the table in FIG. 4, the percentage of total transmission in the red region is 25.43 percent, in the green region 69.28 percent, and in the blue region 5.29 percent.

Figure 5:
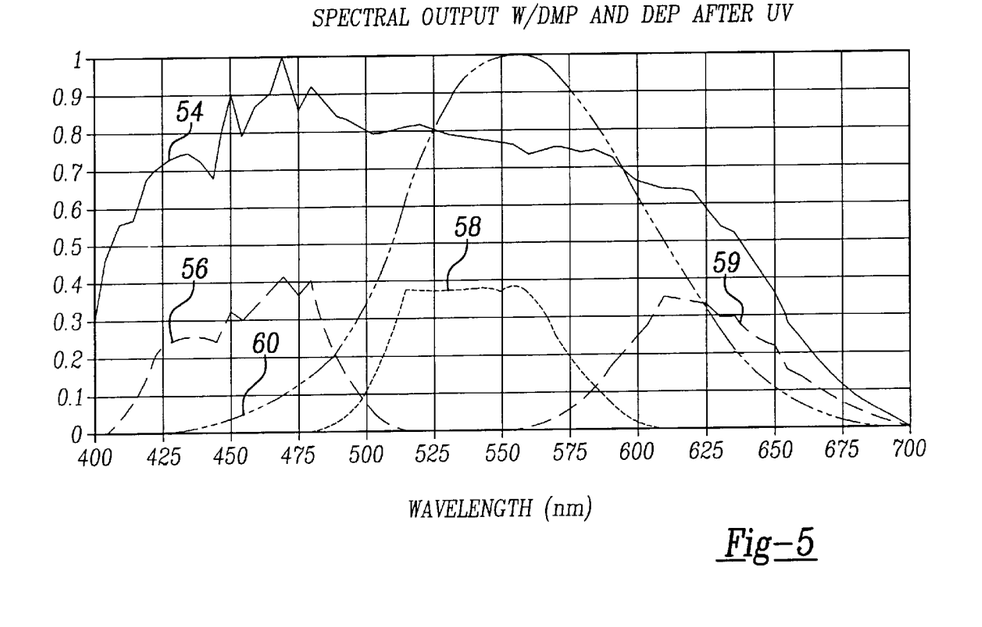
FIG. 5 is a graph of a spectral output of either the DMP or DEP optical fluid verses wavelength throughout the optical spectrum shown for various optical regions.

In contrast, referring now to FIG. 5, similar sets of curves are shown for a MacNeille prism using utilizing either DMP or DEP for the optical fluid. Curve 56 shows the transmission of blue light, curve 58 shows the transmission of green light, and curve 59 shows transmission of red light. Again, curve 60 shows the (normalized) photoptical sensitivity curve which is assumed to be the ideal light source at the input of the prism. Curve 54 shows the expected spectral output obtained by combining the input and the transmission. The data is for a modeled prism with an 18 inch path length for a prism filled with the various optical fluids.

Figure 6:
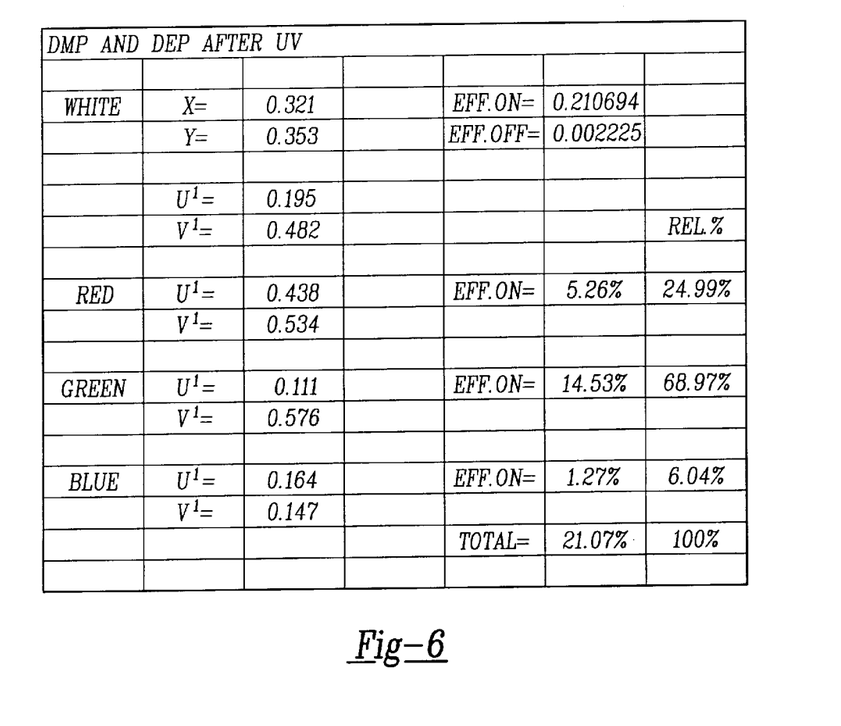
FIG. 6 is a table summarizing the data upon which the graphs in FIG. 5 are based.

Referring now to FIG. 6, it can be seen that the red region of the spectrum accounts for 24.99% of the total transmission; the green channel, 68.9%; and the blue channel, 6.04%. This illustrates how the optical system utilizing either DMP or DEP results in more transmission in the blue region as a percentage of the total light transmitted. This improvement in the color temperature makes possible the advantage discussed above. That is, reducing the necessity of turning down red and green channels to obtain the desired color temperature.

As a result, the present invention provides an optical system which utilizes a low viscosity optical fluid to reduce the temperature-induced striations in the prism 18, and therefore fluctuations in the image that limit resolution and cause oscillations irregularly across the image. In addition, utilizing DMP or DEP as the optical fluid, with DMP being the preferred fluid, has improved transmission overall. Moreover, in a multi-channel color projection system, the system provides the possibility of additional brightness due to the improved transmission in the blue region. Also, both DMP and DEP recover well from freezing and are lower in cost than previous optical fluids.

Another important aspect of either DMP or DEP is that these optical fluids are not a mixture of component fluids and that they are free of contaminants. The purity of DMP and DEP is easily measured and these fluids are available in consistently pure form which typically does not vary from batch to batch in manufacturing lots. It is thought that purity is an important factor in the successful use of DMP or DEP as an optical fluid. For this reason, filtering may be employed to insure that there are no contaminants. For example, it has been found to be advantageous to filter DMP and DEP to at least 1.0 micron and ideally to 0.6 microns. It is contemplated that the DMP or DEP should be at least 98.5% pure to obtain satisfactory results. It is also important to maintain purity for example, by preventing contamination from containers, to ensure the elimination of immiscible contaminating substances.

It should also be noted that other transmissive, homogenous, low-viscosity fluids with indices matching a desired glass may also yield similar advantages as DMP and DEP. In general, the fluid should be transparent, have an index of refraction matching the desired optical components, and have a viscosity no greater than 40 centistokes to achieve the advantages of the present invention. For example, fluids meeting this criteria which have low molecular weight hydrocarbon as a major component may be utilized. One example of such an alternate optical fluid would be methyl benzoate. Also, fluid of the ester phthalate family may be used. Additionally, a combination of DMP and DEP would be expected to be nearly as satisfactory as either DMP or DEP alone.

It should also be noted that the advantages of the present invention can be obtained in other embodiments besides color projection systems and in other systems besides Mac-Neille prisms. In general, the present invention will find advantageous used in any application where it is desired to provide an optical fluid with an index close to or matching to BK-7 glass, or a fluid having an index matching other materials with other indices of refraction. One such application could include the optics employed in a digital or analog still shot camera, or as part of the optical system employed in a wide range of hand held or stationary video cameras. The low viscosity characteristics of either DMP or DEP allow these optical fluids to be particularly suited for the optical system of these miniaturized still or video cameras.

Turning now to FIGS. 7 and 8, a liquid crystal light valve color projection system 100 is shown in accordance with an alternate preferred embodiment of the present invention. The LCLV projection system 100 comprises a three-color system having a red channel 102, a green channel 104, and a blue channel 106. A variety of image sources and image forming devices can be used to generate the image information for each color channel. The three color channels are ultimately combined for producing a color composite image 108. An optical fluid tank 110 contains the requisite optical elements for combining the images produced by each color channel 102, 104, 106. The internal design of optical tank 110 forms a two-level optical deck. Illumination light, such as red illumination light 103 enters the upper level 111 through an optical window 112, and is reflected by mirror 114 down to the lower level 113. The lower level 113 contains the various prism plates 116 (immersed within the optical fluid 20) which function as the polarizing beam spitters 18' within the optical tank 110. The prism plates 116 and the resulting polarizing beam splitters 18' are substantially similar to prism plate 16 and PBS 18 described above and shown in FIG. 1.

This two-level design for optical fluid tank 110 allows for a more efficient and compact layout for the optics and electronics associated with the LCLV color projection system 100. As will be appreciated, optical tank 110 is completely filled with an optical fluid 20. Preferably, the optical fluid 20 is one of either DMP or DEP, or a combination of DMP and DEP, in accordance with the teachings of the present invention. The benefits of utilizing DMP or DEP as the optical fluid within optical tank 110 are specifically described above.

The front or projection end of the upper level 111 of the optical fluid tank 110 is provided with three optical window openings 112. Each of the red, green and blue illumination rays are projected through their associated optical window 112 from an illumination light source, such as light source 11 as illustrated in FIG. 1. The reflecting mirror 114, associated with each color channel 102, 104, 106, reflects the illumination light to the prism plate 116 located within the lower level 113 of the optical tank 110. The lower level also contains an image combiner 120.

With reference to FIG. 7, a red reflecting mirror 118 and a blue reflecting mirror 119 are aligned for reflecting the red and blue images (respectively) toward opposite sides of the image combiner 120. The green color signal is transmitted by the prism plate 116 directly into the image combiner 120. The separate red, green and blue images are combined within the image combiner 120 as is known within the art and projected through an image output lens 122. The color composite image 108 is then received by a projection lens system 124 for presentation onto a suitable projection screen or display surface (not shown). As will be appreciated, all of the optical elements disposed within optical fluid tank 110 are completely immersed within the optical fluid 20.

With continued reference to FIGS. 7 and 8, the image forming components associated with the LCLV color projection system 100 are disclosed. Each color channel 102, 104, 106 includes a liquid crystal light valve 34 which receives the "S" polarized illumination light reflected from the prism plate 116 through optical window 115, and receives the image information from a cathode ray tube 36 on its rear face. A video controller 140 provides each color image signal in black and white format to the cathode ray tubes 36. As shown, each cathode ray tube 36 includes a CRT face plate heat spreader 128. Each cathode ray tube 36 is also optically coupled to the rear surface of the liquid crystal light valve 34 with a relay lens 35.

As described above, prism plate 116 reflects light having an "S" polarization state, and transmits light having a "P" polarization state. For the phosphor areas of the screen of cathode ray tube 36 that are bright, some or all of the light reflected from the light valve 34 is rotated from "S" polarization state to "P" polarization state. This light of "P" polarization state is retroreflected by the light valve 34 and transmitted back toward optical window 115, and through the prism plate 116 toward reflecting mirror 118, and on to the image combiner 120.

As disclosed, the optical fluid tank 110 is filled with one of the preferred optical fluids 20 disclosed above. As is known, these fluids expand when heated and contract when cooled. Accordingly, optical fluid tank 110 is provided with a pair of expansion diaphragms 126 which allow for the expansion and contraction of the optical fluid 20 to avoid leaks and/or rupturing of the optical fluid tank 110. Any expansion or contraction of the optical fluid tank 110 could also cause unwanted distortion of the color image 108 due to misalignment of the optical elements disposed therein. Alternatively, the expansion diaphragm 126 may comprise a metal bellows, or a small chamber which extends above the surface of the optical fluid tank 110 containing an air bubble which can expand and contract.

Figure 9:
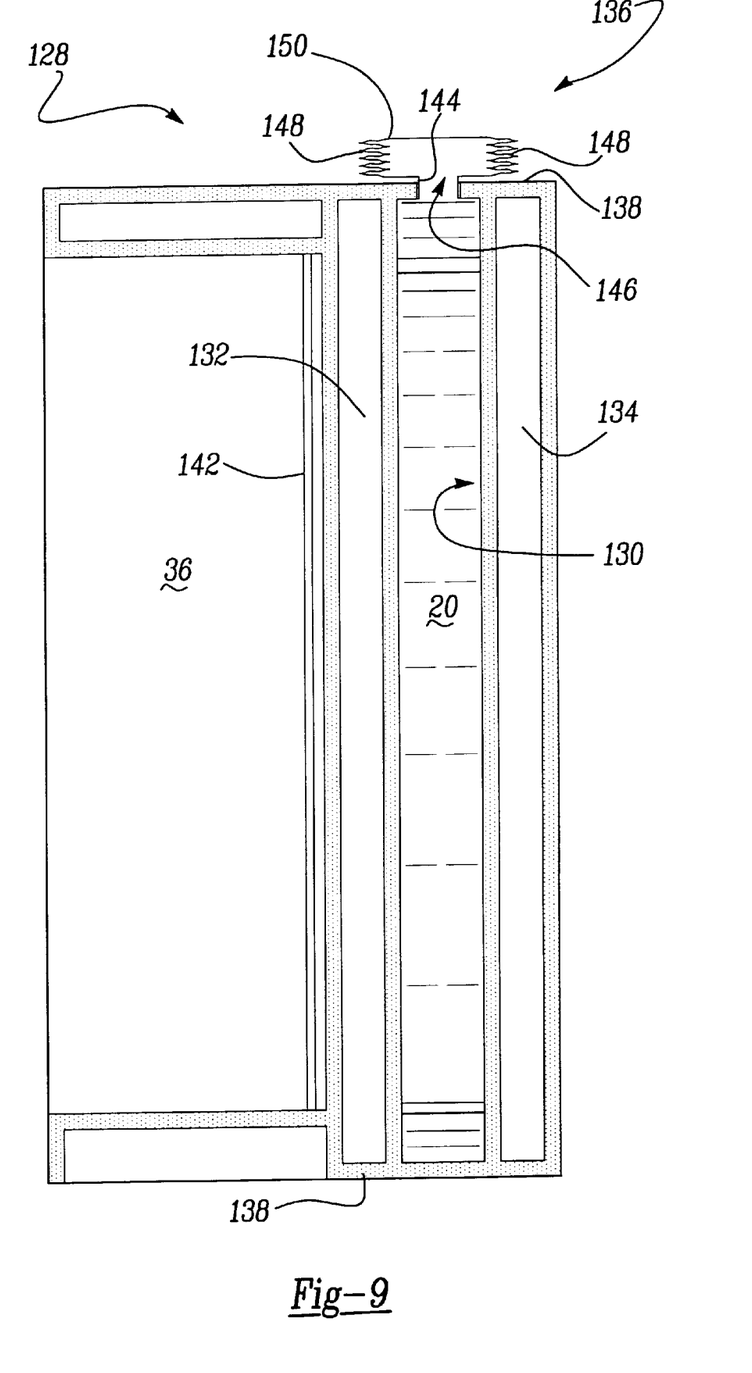
FIG. 9 is a partial sectional view of yet another optical fluid container for containing the optical fluid of the present invention.

Turning now to FIG. 9, the heat spreader 128 includes a fluid tight chamber 130 for containing the optical fluid DMP or DEP 20 according to the present invention. The CRT bulb face plate 132 contacts one side of heat spreader 128. The phosphor layer 142 of CRT 36 is positioned directly behind CRT bulb face plate 132. The heat spreader 128 also includes an outer cover face plate 134. The outer portion of heat spreader 128 forms a peripheral seal 138 which serves to maintain CRT 36 in optical alignment with the heat spreader 128. The heat spreader 128 in conjunction with the optical fluid 20 functions to dissipate heat away from CRT 36. While not specifically shown, heat spreader 128 can be designed to be larger than the surface area of CRT 36 to provide additional fluid volume and surface area for enhancing the thermal exchange and cooling capabilities of the heat spreader 128.

The heat spreader 128 is also provided with an expansion bellows 136 which is secured within the top portion of the peripheral seal 138. As shown, expansion bellows 136 includes a stem 144 which extends through the top surface of the peripheral seal 138. The inner portion of stem 144 forms a flow aperture 146 which allows the optical fluid 20 to flow in and out of the expansion bellows 136. A plurality of annular fins 148 are disposed between the stem 144 and a cap portion 150, and form the bellows mechanism. The annular fins 148 are preferably formed from metal and allow the cap 150 to move vertically, thus adjusting the volume of the bellows 136 as the optical fluid 20 expands and contracts. Optionally, an O-ring gasket (not shown) may be fitted between the stem 144 and the peripheral seal 138 for enhancing the sealing capabilities of expansion bellows 136.

The following discussion discloses and describes exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. An optical system comprising:
   a fluid;
   a container filled with the fluid having at least one window for permitting subject light to enter therein;
   at least one optical element within the container for performing a predetermined optical function on the subject light, wherein the fluid has a viscosity of no greater than 40 centistokes and the optical element has an index of refraction approximately the same as the fluid, the fluid providing increased transmission of blue light as a percentage of total light being transmitted.

2. The optical system of claim 1 wherein the fluid has a low molecular weight hydrocarbon as a major component.

3. The optical system of claim 2 wherein the fluid is in the ester phthalate family.

4. The optical system of claim 3 wherein the fluid is dimethyl phthalate.

5. The optical system of claim 3 wherein the fluid is diethyl phthalate.

6. The optical system of claim 1 wherein the fluid is transparent.

7. The optical system of claim 1 wherein the fluid is 98.5% pure.

8. The optical system of claim 1 wherein the optical element includes a prism plate having an index of refraction of about 1.518 at about 554.5 nanometers.

9. The optical system of claim 1 wherein the optical element is a polarizing beam splitter.

10. The optical system of claim 1 wherein the optical element includes an optical fluid tank having an image combiner disposed therein.

11. The optical system of claim 1 further including a second window permitting subject light to exit the container therefrom.

12. The optical system of claim 11 further including a third window permitting subject light to exit and enter therefrom.

13. A method of producing an optical system, said method comprising:
    mounting at least one optical element in a fluid tight container, wherein the optical element has a predetermined index of refraction;
    filling the fluid tight container with a low molecular weight homogeneous fluid that increases transmission of blue light as a percentage of total light being transmitted, having a viscosity of no greater than 40 centistokes and having an index of refraction approximately the same as the optical element; and
    sealing the container.

14. The method of claim 13 further comprising the step of:
    prior to filling the container, filtering the fluid to remove impurities with a filter capable of removing particles as small as one micron.

15. The method of claim 13 wherein the fluid is selected from the group consisting of dimethyl phthalate and diethyl phthalate.

16. A projection system comprising:
    a light source;
    an image forming device, the image forming device receiving light from the light source;
    a projection lens for receiving light from the image forming device;
    a prism element disposed in the optical path between the light source and the image forming device and also between the light path between the projection lens and the image forming device, wherein the prism element includes an optical element having a predetermined index of refraction; and
    an enclosure containing the prism element, the enclosure also containing a fluid having a viscosity of no greater than 40 centistokes and having an index of refraction approximately the same as the optical element and providing increased transmission of light in the optical spectrum, wherein the optical element is immersed in the fluid.

17. The optical system of claim 16 wherein the fluid is selected from the group consisting of dimethyl phthalate and diethyl phthalate.

18. The optical system of claim 16 wherein the fluid is 98.5% pure.

19. The optical system of claim 16 wherein the optical element includes a prism plate having an index of refraction of about 1.518 at about 554.5 nanometers.

20. The optical system of claim 16 further including a second window permitting subject light to exit the enclosure.

21. The optical system of claim 16 further including a third window permitting subject light to exit and enter the enclosure.

22. An optical system comprising:
    a transparent fluid selected from the group consisting of dimethyl phthalate and diethyl phthalate;
    a container filled with the fluid having at least one window for permitting subject light to enter therein;
    at least one optical element within the container for performing a predetermined optical function on the subject light, wherein the fluid has a viscosity of no greater than 40 centistokes and the optical element has an index of refraction approximately the same as the transparent fluid.

23. A liquid crystal light valve (LCLV) projection system comprising:
- a light source;
- a cathode ray tube;
- an LCLV receiving light from the light source and the CRT;
- a projection lens receiving light from the LCLV;
- a prism element disposed in the optical path between the light source and the LCLV and also between the light path between the projection lens and the LCLV, wherein the prism element includes an optical element having a predetermined index of refraction; and
- an enclosure containing the prism element, the enclosure also containing a transparent diethyl phthalate fluid having a viscosity of between about 9 and 40 centistokes and having an index of refraction approximately the same as the optical element, wherein the optical element is immersed in the fluid, the fluid being 98.5% pure.

* * * * *